United States Patent [19]

Schmetzer

[11] 4,398,683
[45] Aug. 16, 1983

[54] AIRCRAFT WITH THRUST AND LIFT AUGMENTING AIRFOIL

[76] Inventor: William M. Schmetzer, 15740 Sherman Way, Van Nuys, Calif. 91406

[21] Appl. No.: 155,490

[22] Filed: Jun. 2, 1980

Related U.S. Application Data

[60] Continuation-in-part of Ser. No. 973,337, Dec. 26, 1978, abandoned, which is a division of Ser. No. 844,157, Oct. 21, 1977, abandoned, which is a continuation-in-part of Ser. No. 716,023, Aug. 19, 1976, abandoned.

[51] Int. Cl.³ .......................................... B64C 21/04
[52] U.S. Cl. .................................. 244/12.5; 244/207; 244/215
[58] Field of Search ............................. 244/215–219, 244/45 R, 12.5, 48, 207, 211, 212

[56] References Cited

U.S. PATENT DOCUMENTS

| | | | |
|---|---|---|---|
| 1,600,834 | 9/1926 | Mader | 244/216 |
| 1,712,705 | 5/1929 | Kluse | 244/12.1 |
| 2,302,925 | 11/1942 | Vo Schippe | 244/207 |
| 3,312,426 | 4/1967 | Fowler | 244/12.5 |
| 3,884,432 | 5/1975 | Blanchard, Jr. et al. | 244/207 |
| 3,938,760 | 2/1976 | Hoppner et al. | 244/12.5 |
| 4,019,696 | 4/1977 | Hirt et al. | 244/207 |
| 4,283,029 | 8/1981 | Rudolph | 244/216 |
| 4,301,980 | 11/1981 | Bradfield et al. | 244/12.5 |

FOREIGN PATENT DOCUMENTS 538902  8/1941  United Kingdom ................ 244/216

OTHER PUBLICATIONS

Mehus, "An Exper. Invest. into the Shape of Thrust Aug. Surfaces in Conj. with Coanda-Deflected in", #79, Utias Tech. Note Jan. 1965.
Feistel et al., "Results of a Brief Flight Invest. of a Coin-Type STOL Aircraft", NASA TN D-4141, Aug. 1967.

*Primary Examiner*—Galen L. Barefoot

[57] ABSTRACT

An aircraft is disclosed having a jet engine whose exhaust stream flow rearwardly from above the trailing edge of a main wing of the craft, and having an auxiliary airfoil which is lower than and offset rearwardly with respect to the wing and acts during takeoff to augment thrust and lift, and during braking and landing to increase drag and lift. The airfoil is mounted for adjusting movement between a cruise position in which it is generally parallel to but lower than and spaced from the wing and one or more inclined positions for takeoff, landing and braking in which the airfoil has its leading edge spaced rearwardly and downwardly from the trailing edge of the wing and defines with that trailing edge a gap across which the jet engine exhaust stream flows in a relation drawing air through the gap from under the wing.

14 Claims, 11 Drawing Figures

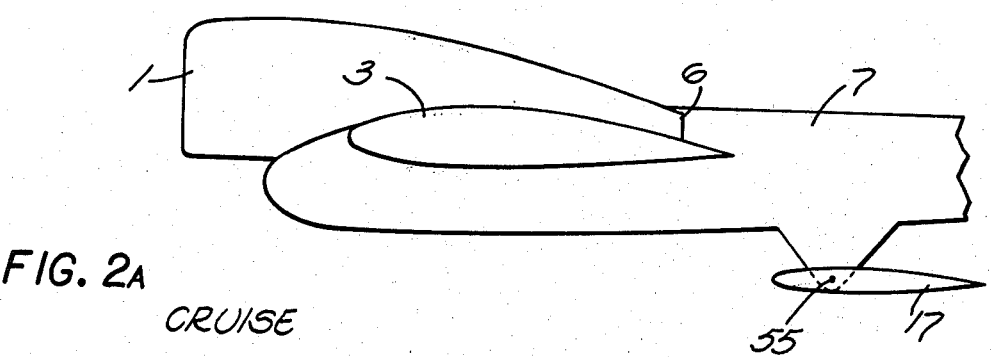
FIG. 2A  CRUISE
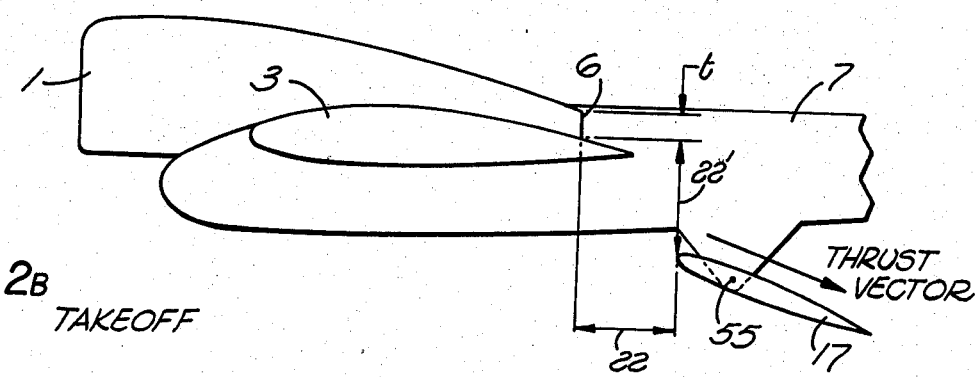
FIG. 2B  TAKEOFF
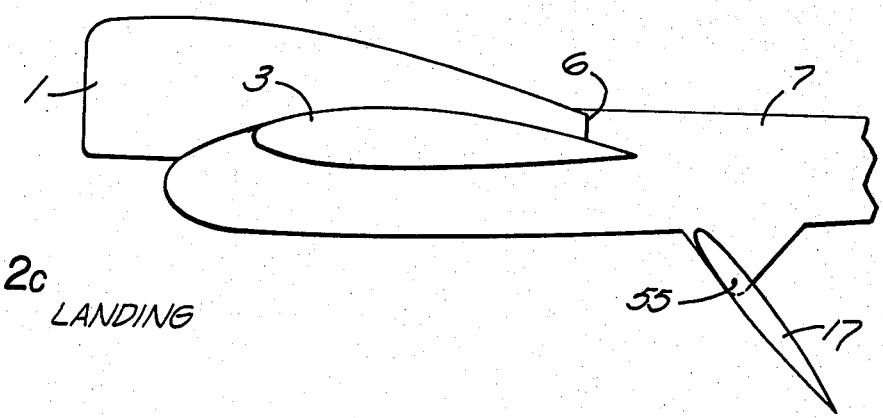
FIG. 2C  LANDING
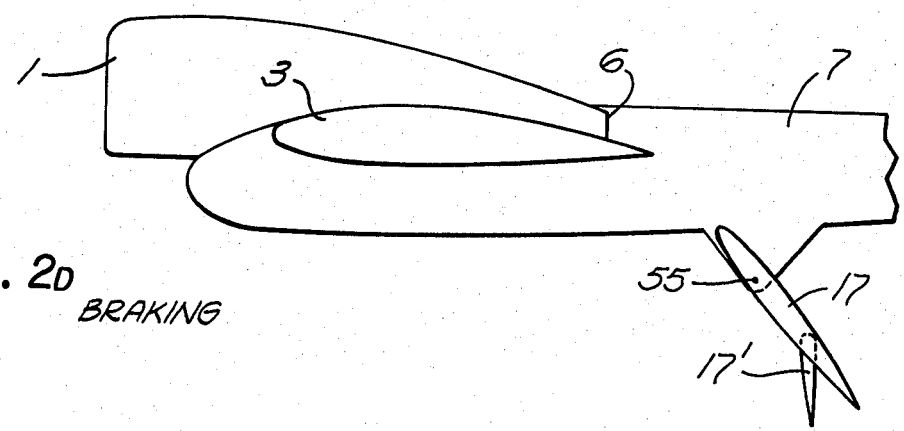
FIG. 2D  BRAKING

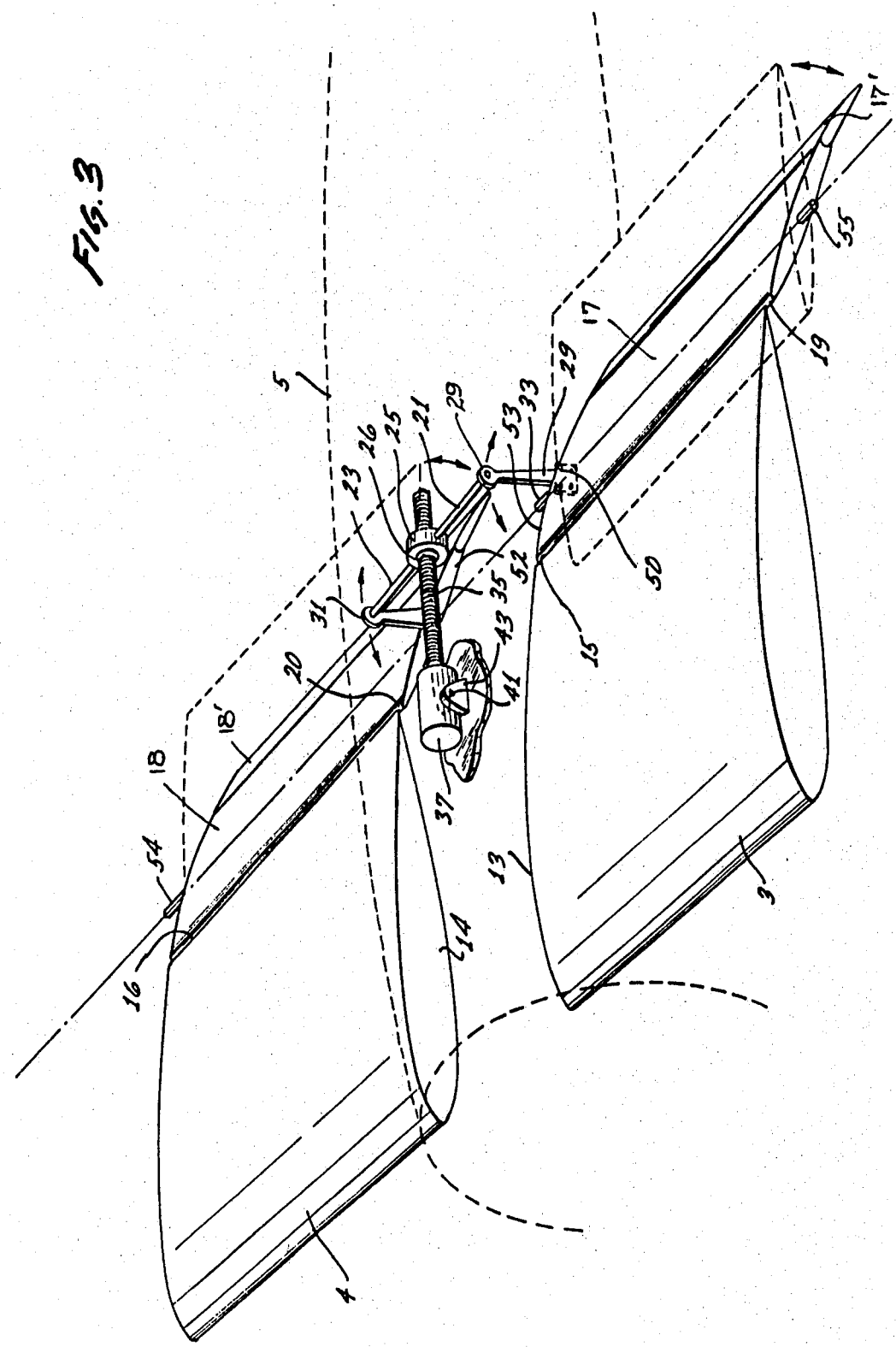

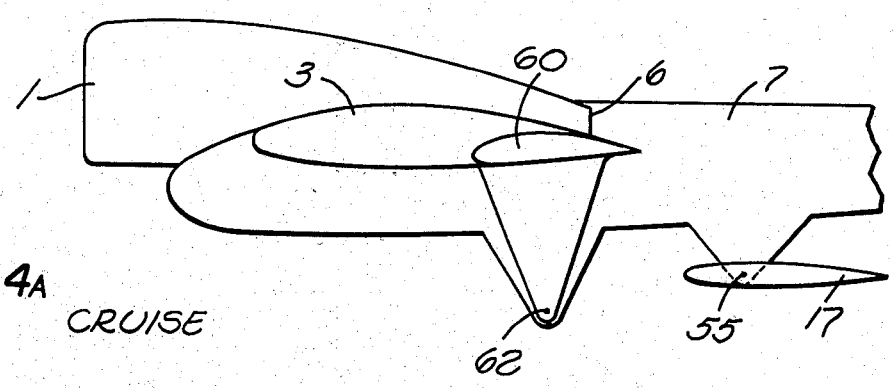
FIG. 4A CRUISE
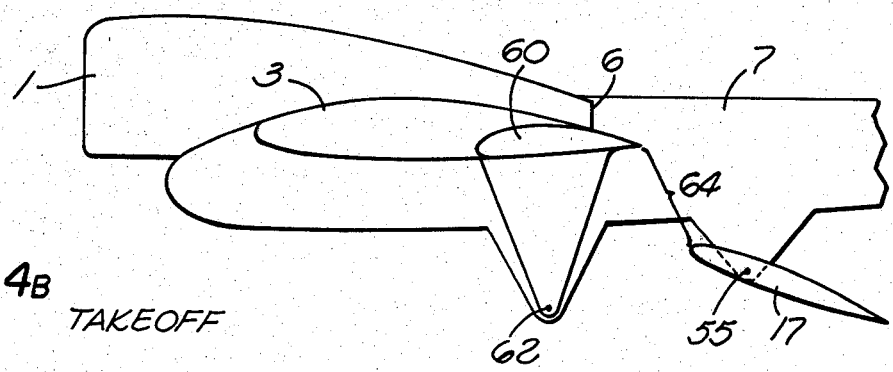
FIG. 4B TAKEOFF
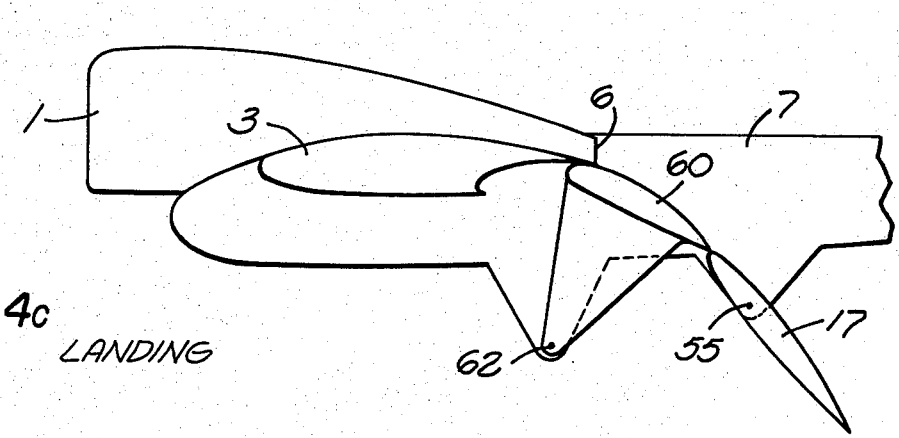
FIG. 4C LANDING
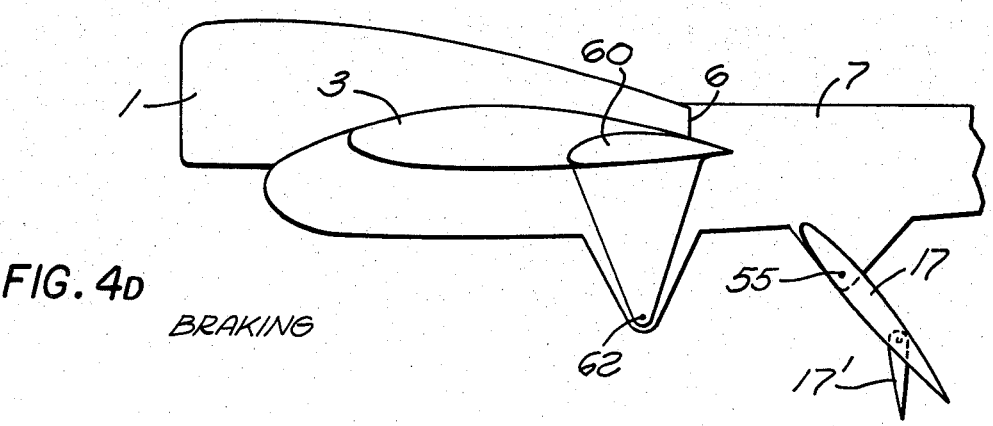
FIG. 4D BRAKING

1

AIRCRAFT WITH THRUST AND LIFT AUGMENTING AIRFOIL

CROSS-REFERENCE TO RELATED APPLICATIONS

This application is a continuation-in-part of application Ser. No. 973,337 filed Dec. 26, 1978 entitled "Aircraft Sponson", which is a division of application Ser. No. 844,157 filed Oct. 21, 1977 entitled "Aircraft Sponson", which was a continuation-in-part of application Ser. No. 716,023 filed Aug. 19, 1976 entitled "Lift Sponson", all the above now abandoned.

BACKGROUND OF THE INVENTION

1. Field of the Invention

The invention relates to aircraft and components thereof for augmenting performance in various modes of operation including the cruise mode, takeoff mode, landing mode, and braking mode, and particularly for short field landing and takeoff aircraft.

2. Description of the Prior Art

Existing short field landing and takeoff aircraft have required relatively high thrust engines in order that takeoff speed might be attained over a relatively short distance of travel. Such aircraft have also required special devices to enable landing and braking in a short field situation. Various means have been utilized or proposed to achieve desired performance levels of such short field aircraft. Perhaps the best known expedient has been to use flaps carried on the main wing at either its leading or trailing edge. Other approaches are disclosed in U.S. Pat. Nos. 3,977,630 (to Lewis et al), 3,018,983 (to Davidson), and 3,884,432 (to Blanchard et al). All of these prior arrangements known to me, however, have had very serious deficiences in the areas of performance, economy, excessive complexity, or otherwise which have narrowly limited their use and have left essentially unsatisfied the long-felt need for an aircraft having a short field capability which is efficient, economical, and readily fabricable.

SUMMARY OF THE INVENTION

The present invention enables attainment of an extremely effective short field takeoff and landing capability in a high speed jet aircraft by employment of a simple structural arrangement which lends itself to low cost fabrication but is inherently reliable in operation and easily actuable in controlled fashion between takeoff, landing, cruise and braking conditions. The novel aspects of the invention are employed in an aircraft of the type in which a jet engine emits an exhaust stream at a location to discharge rearwardly from above the trailing edge of the main wing of the craft. In accordance with the invention, I provide in conjunction with this engine and wing structure a unique auxiliary airfoil which is positioned lower than and offset rearwardly with respect to the wing, and is actuable between a cruise position in which it offers minimum resistance to high speed forward travel of the aircraft and one or more differently oriented positions for takeoff, landing and braking. During takeoff, the airfoil develops increased thrust and lift at relatively slow speed, while during landing it increases drag and enhances lift, to give the aircraft the desired short field takeoff and landing capability. In the preferred arrangement, two such airfoils are provided at opposite sides of the aircraft in conjunction with two jet engines exhausting rearwardly from above the trailing edges of two main wing sections.

In the cruise position, each such airfoil extends generally parallel to the main wing, at approximately a zero angle of attack with respect to the relative wind, and is lower than the main wing and spaced from it. In the takeoff position, the airfoil is inclined at an angle of attack, and has its leading edge spaced rearwardly and downwardly from the trailing edge of the wing. There is thus formed between the trailing edge of the main wing and the leading edge of the inclined auxiliary airfoil, in the takeoff position of the airfoil, a gap across which the exhaust stream from the jet engine flows, in a relation drawing air through that gap from beneath the main wing for admixture with the exhaust stream and flow rearwardly and downwardly along the upper surface of the auxiliary airfoil, in a manner maximizing both thrust and lift. The combined stream effectively follows the upper surface of the auxiliary airfoil by virtue of the Coanda Effect, which effect causes the high velocity jet stream to attach or adhere to and follow the contour of the upper surface of the airfoil.

The auxiliary airfoil is desirably mounted for swinging movement between its discussed cruise and takeoff positions, preferably about a pivotal axis which extends generally transversely of the craft and is desirably located intermediate the leading and trailing edges of the airfoil. In the presently preferred arrangement, the pivotal axis is located approximately midway between those leading and trailing edges, and also is desirably midway between the upper and lower surfaces of the airfoil. The mounting of the airfoil is preferably such that, as it turns between its cruise and takeoff positions, the forward or leading portion of the airfoil swings upwardly toward the level of the main wing and rearwardly with respect to the trailing edge of the main wing, to bring the airfoil from its initial generally horizontal cruise position essentially parallel to the main wing to the discussed inclined positions in which the leading edge of the airfoil is spaced appropriately from the trailing edge of the wing for achieving thrust and lift augmentation.

In its landing and braking conditions, the auxiliary airfoil may be pivoted somewhat beyond the takeoff position, to extend at a steeper inclination than during takeoff. Braking action may be enhanced by provision at the trailing edge of the auxiliary airfoil of an elevator mounted to move to a position of extension more directly vertically than the airfoil itself. In addition, it is desirable in some instances to provide in conjunction with the other described apparatus a flap which is mounted at the rear edge of the main wing and is movable to a position of extension at least partially across the gap between the trailing edge of the main wing and the leading edge of the auxiliary airfoil. Desirably this flap extends entirely across and closes that gap during landing, to provide an essentially continuous and uninterrupted braking surface defined by the wing and the flap and the auxiliary airfoil in combination. In order to laterally confine the jet exhaust and air flow in all modes of operation, the auxiliary airfoils at opposite sides of the fuselage may be endplated, typically between the fuselage and a pair of booms extending in a front to rear direction between the wing and empennage, or alternatively by other end plating structures.

BRIEF DESCRIPTION OF THE DRAWINGS

The above and other features and objects of the invention will be better understood from the following detailed description of the typical embodiments illustrated in the accompanying drawings, in which:

FIGS. 2A, 2B, 2C and 2D are somewhat schematic side elevational views of the FIG. 1 aircraft, illustrating the position of the auxiliary airfoils in a number of different modes of operation of the aircraft;

FIG. 3 is a fragmentary isometric view showing the main wing sections and the auxiliary airfoils;

FIGS. 4A, 4B, 4C and 4D are somewhat schematic side elevational views of an alternative embodiment of the invention.

DESCRIPTION OF THE PREFERRED EMBODIMENTS

Figure 1:
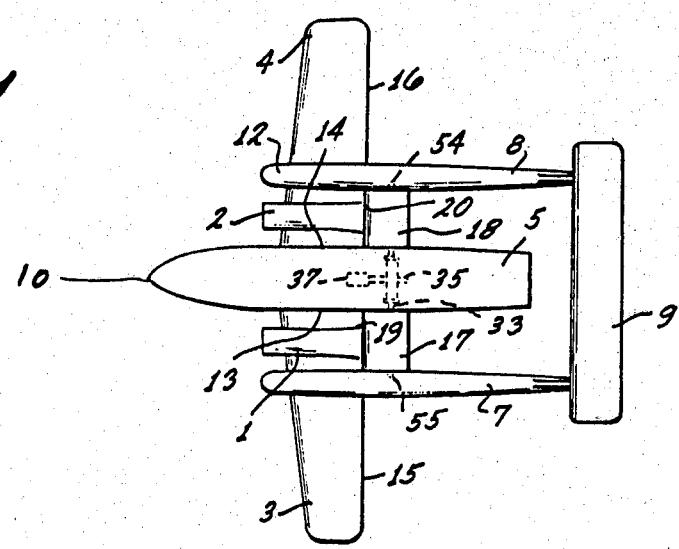
FIG. 1 is a top view of an aircraft constructed in accordance with the invention.

As can be seen in FIG. 1, the structure of the aircraft 10 is symmetrical with respect to the longitudinal axis of the aircraft passing through its fuselage 5. Engines 1 and 2 are high mounted on main aircraft wings 3 and 4 at the inboard sections of the main wings 3 and 4 in close proximity to fuselage 5.

Booms 7 and 8 interconnect the main aircraft wings 3 and 4 with empennage 9. These booms are of a type commonly used on aircraft, and are structurally secured by suitable conventional means to the main aircraft wings 3 and 4 at stations 11 and 12 outboard of main wing roots 13 and 14.

Two thrust, lift and drag augmenting airfoils 17 and 18 as shown in FIG. 1 extend from the port and starboard sides of fuselage 5 to booms 7 and 8 and are movably mounted thereto as will be discussed hereinbelow. The leading edges 19 and 20 of airfoils 17 and 18 are spaced aft of the trailing edges 15 and 16 of the main aircraft wings 3 and 4. As best seen in FIGS. 2A to 2D, the parts 17 and 18 in the preferred configuration of the invention are symmetrically shaped airfoils so that in the zero angle of attack configuration relative to the relative wind (FIG. 2A), no thrust forces are generated by these elements. The internal construction of parts 17 and 18 may be of the type conventionally employed in airfoil sections, utilizing ribs and spar members and covered with thin aluminum alloy sheet forming the aircraft skin or other suitable material to provide an airfoil surface. Airfoils 17 and 18 have relatively large radii of curvature, when aligned with and in conjunction with the main wing airfoils, which radii of curvature may be on the order of 75 percent of that of the main wing chord in a preferred configuration. Elevators 17' and 18' are hinged to the trailing edges of airfoils 17 and 18, and may be of conventional construction and controlled in conventional fashion. These elevators permit control of the thrust vector (described in further detail hereinbelow) by affording the capability of directing the thrust vector relative to the center of gravity of the aircraft. When the thrust vector is directed toward the center of gravity, the pitching moment of the aircraft is minimized. The mounting of the airfoils 17 and 18 between fuselage 5 and booms 7 and 8 produces aerodynamic "end-plating" which results in a two dimensional airflow across the airfoil surface thus increasing efficiency.

Each airfoil 17 and 18 is spaced from its respective main wing section 3 or 4 by a gap formed between the trailing edge of the wing section and the leading edge of the airfoil 17 or 18. Due to the symmetry of airfoils 17 and 18 with respect to the aircraft 10, the discussion hereinbelow based on FIGS. 2A to 2D, which depict only the airfoil 17, applies equally to airfoil 18. The spacing of airfoils 17 and 18 from the main wing is such as to utilize and attain the known "jet-pump" physical effect in accordance with which the passage of an airflow across a gap creates a state of partial vacuum. In addition, a reduced pressure area exists on the upper surface of thrust augmenting airfoil 17. This vacuum in the present arrangement draws in the otherwise stagnant and useless "secondary air" under the main wing, and will continue to so function as the aircraft accelerates, thus substantially increasing efficiency of operation of the aircraft by greatly augmenting both thrust and lift, particularly in the takeoff mode of operation depicted in FIG. 2B. The positioning of airfoils 17 and 18 is desirably such that in the takeoff mode of operation depicted in FIG. 2B, both the horizontal spacing (defined by gap 22) and the vertical spacing (defined by gap 22') of the leading edge of each airfoil 17 or 18 from the bottom of the exhaust nozzle 6 of the jet engine are between about 3 and 5 times the thickness of the jet exhaust stream, as determined by the vertical dimension t of jet exhaust nozzle 6. In the illustrated presently preferred arrangement, gaps 22 and 22' are approximately equal to 4t. Operation of the invention particularly with respect to the takeoff mode is described further hereinbelow.

In addition to the jet-pump principle, the invention utilizes the Coanda Effect in increasing efficiency. Under the Coanda Effect, a high velocity jet stream will attach to, and follow the contour of, a suitably placed surface, provided that the flow is thick and that the surface has a large radius of curvature. Thus, the large radius of curvature of the main wings 15 and 16 in combination with airfoils 17 and 18 implements the Coanda Effect, causing the jet exhaust stream and intermixed secondary air from beneath the wing to flow rearwardly and downwardly along the upper surface of the inclined airfoil, with resultant improved performance of the aircraft due to the enlarged airfoil surface provided by the combination of the airfoils 17 and 18 and the main wing.

Airfoils 17 and 18 are mounted for operation in unison, as shown in FIG. 3, through the use of a bus bar 21 and a bus bar 23 connected to screw jack bearing 25. Pivot arms 29 and 31 are hinged to airfoils 17 and 18 by suitable bracket means 50 and 51 at the respective inboard faces 52 and 53 of the airfoils. An interconnecting member 33 joins pivot arms 29 and 31 and forms the hinge axis about which arms 29 and 31 swing. In the preferred configuration, at the outboard faces of airfoils 17 and 18 and located along the extension of the hinge axis of pivot arms 29 and 31, a pair of pivot pins 54 and 55 are carried by the airfoils for pivotal connection to booms 7 and 8. The inner race 26 of screw jack bearing 25 is threaded and engages a threaded member 35 which is driven by a drive motor 37. Drive motor 37 is pivotally mounted by a pin 41 to a rocker frame 43 which is secured by appropriate fastening means (not shown) to the aircraft structure.

Upon rotation of threaded member 35, bearing 25 is induced to travel longitudinally along member 35 in a direction either forward or aft relative to the longitudinal axis of the aircraft. Movement of bearing 25 is directly transmitted to pivot arms 29 and 31 which rotate about a hinge axis defined by interconnecting member 33 and extending transversely of the fuselage and aircraft. Drive motor 37 pivots about rocker frame 43, with pivot arms 29 and 31 translating the essentially linear motion of bearing 25 into pivotal or rotational motion of airfoils 17 and 18 about the hinge axis. The transverse hinge axis of the airfoils is desirably located between the leading and trailing edges of airfoils 17 and 18, preferably at approximately the 30% chord location, and is desirably midway between the upper and lower surfaces of the airfoils as shown.

By energizing drive motor 37, the operator of aircraft 10 may select the appropriate angle of attack of airfoils 17 and 18. In the FIG. 2B takeoff position, airfoil 17 is disposed at an angle of substantially 20° with respect to the horizontal. Due to the spacing of the airfoil from the main wing, the jet-pump principle operates to draw the secondary air from under the main wing through the gap between the wing and airfoil to mix with the jet exhaust and flow downwardly along the upper surface of the inclined airfoil. This produces the inclined thrust vector depicted in FIG. 2B, which results in augmented forward thrust as well as additional lift. The advantages of such augmented thrust and lift, particularly with regard to short field aircraft, are of substantial importance.

In the cruise mode of FIG. 2A, the angle of attack of airfoils 17 and 18 is zero with respect to the relative wind, and in that mode augmented lift is provided through operation of the Bernoulli Effect upon the additional airfoil surface furnished by elements 17 and 18.

In the landing configuration depicted in FIG. 2C, airfoils 17 and 18 are so positioned that their leading edges are in substantial alignment with the trailing edges of the main wing sections, thus providing added airfoil surface to augment lift.

In the aerodynamic braking mode depicted in FIG. 2D, the airfoils 17 and 18 provide an additional braking surface as well as making possible the utilization of the secondary air under the main wing for the braking operation. In the extreme aerodynamic braking mode, depicted in broken lines in FIG. 2D, elevator 17' is oriented substantially vertically with respect to the relative wind and provides maximum drag for efficient braking of the aircraft.

In the alternative embodiment depicted in FIGS. 4A to 4D, two flaps 60 (only one of which is shown) are employed in conjunction with airfoils 17 and 18 and the main wing to increase efficiency of operation of the aircraft. Flap 60 is mounted on boom 7 by a pivotal connection 62 and is configured to operate in conjunction with a track (not shown) in wing 3. The flap 60 may alternatively be hinged to the wing or the fuselage. Control of the orientation and operation of flap 60 is effected by conventional means. The flap 60 may be controlled in conjunction with the mechanism for controlling the orientation of the airfoil 17 or 18 as described above.

Figure 5:
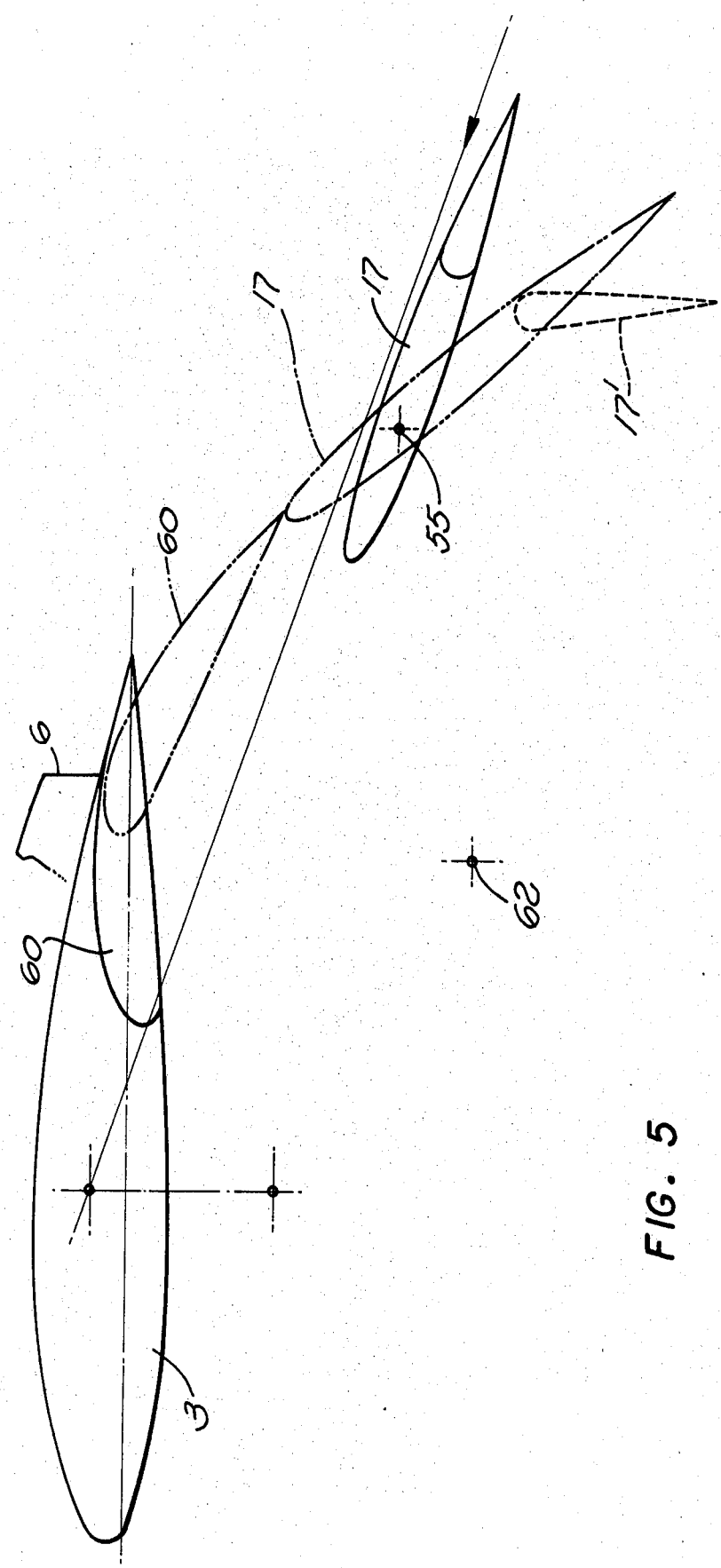
FIG. 5 illustrates the arrangement of FIGS. 4A, 4B, 4C and 4D in enlarged form, with the takeoff position of the auxiliary airfoil and flap shown in full lines, and the landing position of that airfoil and the flap shown in broken lines.

Flap 60 is in its fully retracted position in the cruise mode depicted in FIG. 4A. In that position, the trailing portion of the flap projects rearwardly beyond the remainder of the wing, and functions as the trailing portion of the wing, with the trailing edge of the flap thus defining the trailing edge of the composite wing structure. In the FIG. 4B takeoff condition, airfoils 17 and 18 are in the same position as in FIG. 2B with a gap 64 being formed between the trailing edge of the wing (defined by the flap) and the leading edges of the airfoils 17 and 18 to implement the "jet-pump" action described above. In the landing configuration of FIG. 4C (broken lines in FIG. 5), flap 60 is oriented to form a continuous, massive airfoil surface in combination with airfoil 17 and wing 3. In this position, the configuration produces substantially increased efficiency which is crucial in the landing mode, particularly in short field aircraft. In the aerodynamic braking configuration of FIG. 4D, flap 60 is in the forwardly retracted unrotated position, and the airfoil 17 and elevator 17' are positioned as in FIG. 2D.

In the FIG. 4B takeoff position of the arrangement of FIGS. 4A to 4D and 5, the leading edges of airfoils 17 and 18 desirably have the same relationship to the main wing and the engine exhaust nozzle as in FIG. 2B, so that both the vertical and horizontal spacing of the leading edges of airfoils 17 and 18 from the lower portion of the jet exhaust nozzle are between about 3 and 5 times (preferably approximately four times) the vertical thickness of the jet stream and the vertical height of the exhaust nozzle.

While certain specific embodiments of the present invention have been disclosed as typical, the invention is of course not limited to these particular forms, but rather is applicable broadly to all such variations as fall within the scope of the appended claims.

I claim:

1. An aircraft having a short field takeoff and landing capability comprising:
   a fuselage;
   a main wing attached to said fuselage;
   a jet engine emitting substantially its entire exhaust stream at a location to flow rearwardly from above the trailing edge of said wing;
   an auxiliary thrust augmenting airfoil which is lower than and offset rearwardly with respect to said wing; and
   means mounting said thrust augmenting airfoil for adjusting movement relative to the fuselage and wing between a cruise position in which said airfoil is generally parallel to, but lower than, and spaced a substantial distance from the wing, and a takeoff position in which the airfoil is inclined at a downward and rearward angle of attack in a manner inducing downward and rearward movement of said exhaust stream by the Coanda Effect, with said airfoil in said takeoff position having its leading edge spaced rearwardly and downwardly from the trailing edge of the wing to define with said trailing edge a gap across which said exhaust stream flows in a relation drawing air through the gap from under the wing to attain thrust augmentation.

2. An aircraft as recited in claim 1, in which said means mount the thrust augmenting airfoil for essentially pivotal movement about an axis which extends generally transverse to the fuselage and is generally between the leading and trailing edges of the airfoil in a relation such that as the airfoil pivots from said cruise position toward said takeoff position, the leading edge of the airfoil swings upwardly nearer to the level of said wing and rearwardly with respect thereto.

3. An aircraft as recited in claim 1, in which said thrust augmenting airfoil is end-plated and mounted for pivotal movement between said positions and is located to promote Coanda Effect and implement the overall Bernoulli Effect of the entire wing/flap-thrust augmenting airfoil.

4. An aircraft as recited in claim 1, in which said jet engine has an exhaust nozzle with a height dimension "t" defining the height of said exhaust stream, and both the vertical dimension and the horizontal dimension of said gap in the takeoff position of the thrust augmenting airfoil are between about 3 and 5 times the height of said nozzle.

5. An aircraft as recited in claim 1, in which the thrust augmenting airfoil is movable to a more inclined air braking position in the final phase of landing, and has a trailing edge elevator movable to a near vertical condition in said air braking position of the airfoil.

6. An aircraft as recited in claim 1, in which said means mount said thrust augmenting airfoil for movement to a landing position in which the airfoil is inclined downwardly and rearwardly at a more abrupt angle of attack than in said takeoff position and has its leading edge spaced rearwardly and downwardly from said trailing edge of the wing with a space therebetween.

7. An aircraft as recited in claim 6, including a flap movable from a retracted position to a position of extension across said space between the trailing edge of the wing and the leading edge of said airfoil in said landing position of the latter.

8. An aircraft as recited in claim 1, in which said leading edge of said thrust augmenting airfoil is spaced rearwardly and downwardly from said trailing edge of the wing in said cruise position of the airfoil as well as in said takeoff position.

9. An aircraft as recited in claim 1, in which said airfoil in said takeoff position has its leading edge spaced lower than said trailing edge of the wing a distance substantially greater than the maximum thickness of the airfoil.

10. An aircraft as recited in claim 1, including a flap movable between a retracted position and an active landing position of extension between the trailing edge of said wing and the leading edge of said airfoil.

11. An aircraft as recited in claim 1, in which said leading edge of said thrust augmenting airfoil is spaced rearwardly and downwardly from said trailing edge of the wing in said cruise position of the airfoil as well as in said takeoff position; said means being constructed to mount said airfoil for essentially pivotal movement between said cruise and takeoff positions about an axis which is disposed generally transversely of the fuselage and is generally between the leading and trailing edges of the airfoil in a relation such that as the airfoil pivots from cruise position toward takeoff position the leading edge of the airfoil swings upwardly nearer to the level of said wing and rearwardly with respect thereto, said means mounting said airfoil for further pivotal movement beyond said takeoff position to a landing position in which it is inclined downwardly and rearwardly at a greater angle of attack than in the takeoff position and has its leading edge higher than in the takeoff position and farther rearwardly than in the takeoff position but still offset rearwardly and downwardly from the trailing edge of the wing with a space therebetween.

12. An aircraft as recited in claim 11, in which said jet engine has an exhaust nozzle with a height dimension "t" defining the height of said exhaust stream, and both the vertical dimension and the horizontal dimension of said gap in the takeoff position of the thrust augmenting airfoil are between about 3 and 5 times the height of said nozzle.

13. An aircraft as recited in claim 12, in which said airfoil has a main body portion and a trailing edge elevator movable relative to said main body portion from a position of essential alignment therewith to a position disposed at an angle to and more directly vertical than said main body portion.

14. An aircraft as recited in claim 13, including a flap movable between a retracted position and an active landing position of extension between the trailing edge of said wing and the leading edge of said airfoil.

* * * * *